(12) United States Patent
Holmgren (10) Patent No.: US 7,055,672 B2
(45) Date of Patent: Jun. 6, 2006

(54) BAGGAGE POSITIONER FOR BAGGAGE CONVEYOR

(75) Inventor: Kurt B. Holmgren, Salt Lake City, UT (US)

(73) Assignee: The Horsley Company, Ogden, UT (US)

(*) Notice: Subject to any disclaimer, the term of this patent is extended or adjusted under 35 U.S.C. 154(b) by 7 days.

(21) Appl. No.: 10/724,595

(22) Filed: Nov. 28, 2003

(65) Prior Publication Data

US 2005/0115801 A1    Jun. 2, 2005

(51) Int. Cl.
*B65G 43/00*    (2006.01)

(52) U.S. Cl. ............. 198/444; 198/454; 198/455; 198/457.06

(58) Field of Classification Search ........ 198/453, 198/454, 455, 457.06, 443, 444, 597
See application file for complete search history.

(56) References Cited

U.S. PATENT DOCUMENTS

| | | | | |
|---|---|---|---|---|
| 2,743,807 A * | 5/1956 | McKune | ...... | 198/454 |
| 3,128,868 A | 4/1964 | Bowen | ...... | 198/33 |
| 3,209,887 A | 10/1965 | Feldstein | ...... | 198/25 |
| 3,306,424 A | 2/1967 | Fahrenbach | ...... | 198/33 |
| 3,312,326 A | 4/1967 | Huppenthal | ...... | 198/33 |
| 3,578,141 A | 5/1971 | Sheehan | ...... | 198/33 |
| 3,799,319 A | 3/1974 | Cutler et al. | ...... | 198/29 |
| 4,054,201 A * | 10/1977 | Rollinger | ...... | 198/455 |
| 4,085,839 A | 4/1978 | Crawford | ...... | 198/410 |
| 4,709,799 A | 12/1987 | Ljungberg | ...... | 198/412 |
| 4,889,224 A | 12/1989 | Denker | ...... | 198/382 |
| 4,901,842 A | 2/1990 | Lemboke et al. | ...... | 198/415 |
| 4,927,133 A | 5/1990 | Evans | ...... | 271/225 |
| 4,930,615 A | 6/1990 | Nash | ...... | 198/411 |
| 4,967,899 A | 11/1990 | Newsome | ...... | 198/411 |
| 5,074,400 A | 12/1991 | Focke et al. | ...... | 198/415 |
| 5,343,998 A | 9/1994 | Depinet et al. | ...... | 198/415 |
| 5,372,238 A | 12/1994 | Bonnet | ...... | 198/455 |
| 5,518,103 A | 5/1996 | Achelpohl et al. | ...... | 198/416 |
| 5,660,262 A | 8/1997 | Landrum et al. | ...... | 198/411 |
| 5,738,202 A | 4/1998 | Ydoate et al. | ...... | 198/460.1 |
| 5,782,332 A * | 7/1998 | Guidetti et al. | ...... | 198/444 |
| 5,887,699 A | 3/1999 | Tharpe | ...... | 198/367 |
| 6,032,782 A | 3/2000 | Sampson | ...... | 198/374 |
| 6,076,683 A | 6/2000 | Okada et al. | ...... | 209/656 |
| 6,131,723 A | 10/2000 | Schroader et al. | ...... | 198/597 |
| 6,220,422 B1 | 4/2001 | Lee | ...... | 198/370.07 |
| 6,328,300 B1 | 12/2001 | Stefan et al. | ...... | 271/2 |
| 6,390,277 B1 | 5/2002 | Pelka | ...... | 198/456 |
| 6,419,074 B1 | 7/2002 | Rasile et al. | ...... | 198/399 |
| 6,425,475 B1 | 7/2002 | Franta | ...... | 198/415 |
| 6,435,332 B1 | 8/2002 | Price | ...... | 198/375 |
| 6,435,498 B1 | 8/2002 | Stefan et al. | ...... | 271/2 |
| 6,580,778 B1 | 6/2003 | Meder | ...... | 378/57 |
| 6,597,760 B1 | 7/2003 | Beneke et al. | ...... | 378/57 |
| 6,607,065 B1 | 8/2003 | Peppel | ...... | 198/367 |
| 6,622,847 B1 | 9/2003 | Schuitema et al. | ...... | 198/399 |

FOREIGN PATENT DOCUMENTS

JP    2-144321    *    2/1990    ........ 198/454

* cited by examiner

*Primary Examiner*—James R. Bidwell
(74) *Attorney, Agent, or Firm*—J. David Nelson (57) ABSTRACT

A baggage positioner having a horizontal conveyor, a position sensor, a pair of positioning arms with bi-directional vertical belts and a positioning arm controller. Other sensors can be added to provide additional data for enhanced effectiveness. The vertical belts can also be equipped with variable speed drives for enhanced effectiveness.

100 Claims, 7 Drawing Sheets

BAGGAGE POSITIONER FOR BAGGAGE CONVEYOR

FIELD OF THE INVENTION

This invention is in the field of automated baggage handling devices and in particular is in the field of baggage positioning equipment for jam reduction and prevention for baggage conveyors.

BACKGROUND OF THE INVENTION

Airport and passenger transport aircraft security have become a dramatically increasing concern in recent years. New procedures and new equipment for increasing the effectiveness of airport and aircraft security have become necessary. This includes faster and more effective methods and equipment for automated baggage and air freight inspection.

Equipment that is being installed and utilized at increasing numbers of airports are Explosive Detection Systems ("EDS"). At the present time there are two EDS devices that are most commonly used at airports. One of these devices admits baggage items with a width of up to 25 inches and a height of up to 19 inches. The other has a two tier opening. For the latter, if a baggage item is less than 16 inches tall, it can have a width of up to 29 inches. If the baggage item is taller than 16 inches but less than 21.5 inches in height, the width is limited to 21.5 inches.

Each of these two commonly used EDS devices as well as other EDS equipment and other airport baggage inspection equipment must operate on a continuous basis for a baggage stream fed by common baggage conveyors. Newer baggage conveyor belts are typically 39 inches wide and baggage fed by such conveyors may be in any orientation and in any lateral position on the belt. Other feed conveyor belts in use, particularly older ones, may have a width of 33 inches or 27 inches. "Repositioning" of a baggage item, which may include lateral displacement of the geometric center of the baggage item or may include reorienting of the baggage item by rotation of the baggage item about its geometric center, or both, may be required for a baggage item to be positioned entirely within the desired baggage stream width. For purposes of this application the term "position" as used with regard to a baggage item, including use in the form "positioning" or "positioned", shall be deemed to include lateral location and orientation on a horizontal conveyor belt, unless stated otherwise. Baggage items randomly positioned on a 39 inch or other size feed conveyor belt may require repositioning in order to pass through a 29 inch wide opening, a 21.5 inch wide opening, or an opening of other width, particularly if the allowable width varies depending upon the height of the baggage. This has been an ongoing problem since the installation of the EDS devices. A similar problem may exist at an entrance to other baggage inspection or handling equipment and at transitions between newer and older conveyor belts, which often have different widths, thereby requiring a reduction of the baggage stream width.

Air freight parcels and other items, hereinafter referred to as "air freight items" which are commonly shipped in box shaped containers of cardboard or other materials, are also typically handled by conveyors at airports. Air freight items are likewise the subject of increased security concern at airports and inspection equipment and procedures for air freight items is receiving increasing attention. This is particularly true of air freight items which are shipped on passenger aircraft along with passenger baggage. Air freight items, particularly items shipped in box shaped containers, are less likely than baggage items to jam at points where the stream width is reduced. This is because many baggage items are not firm or rigid in form or have corners, edges or surfaces of resilient material, and thus do not slide as readily as cardboard boxes. The present invention can be used for air freight items as well as passenger baggage items. In the interest of brevity, for purposes of this application the term "baggage" shall be defined to include passenger baggage items and air freight items and the term "baggage item" shall be defined to be either a passenger baggage item or an air freight item.

The operation of EDS devices has typically required the presence of a full time operator to prevent jams. While repositioning equipment is currently being used at most installations, the effectiveness of such equipment is too low to allow the EDS devices to be operated without a full time operator. The jam incidence rate is currently no better than 3% for the repositioning equipment currently in use with the EDS devices.

It is an objective of the present invention to provide a baggage positioner device for a conveyor baggage stream which will substantially decrease the jam incidence rate at the entrance to baggage inspection equipment and at other locations where the baggage stream width must be reduced.

It is a further objective of the present invention to provide a baggage positioner device which will eliminate the need for a full time operator for an EDS device installation and reduce operator requirements for other locations where the baggage stream width must be reduced.

It is a further objective of the present invention to provide a baggage positioner device which is relatively economical to construct and simple to operate and maintain.

It is a further objective of the present invention to provide a baggage positioner device with a variable discharge width thereby providing for a variable reduction in the width of a baggage stream.

SUMMARY OF THE INVENTION

A preferred embodiment of the baggage positioner is comprised of a horizontal conveyor, a pair of opposing positioning arms, position sensor, support structure, and positioning arm controller which is linked to the position sensor and the positioning arms. Other sensors and features can be added for additional flexibility and enhanced performance.

The horizontal conveyor will preferably be a typical conveyor belt with a horizontal belt drive. The horizontal conveyor drive means may have a fixed speed thereby providing for a fixed and known horizontal conveyor belt speed or may be equipped with a variable speed drive, such as a variable frequency drive, which may also communicate with the positioning arm controller thereby providing for user selected or automated variation in the speed of the horizontal belt. The speed of the horizontal belt will generally need to be equal to or greater than the speed of the feed conveyor delivering baggage to the baggage positioner.

The positioning arms each have a vertical belt with a vertical belt bi-directional drive means, which typically will utilize a motor, drive, drums, and a tension mechanism, all of which are known in the art. An automated switch can be used to reverse the motor or the drive, to provide for changing the direction of belt movement, providing for bi-directional movement of each of the vertical belts. The vertical belt bi-directional drive means communicates with the positioning arm controller, which independently operates each vertical belt, turning each on and off and determining the direction of movement of each belt as needed to position baggage items for a reduced baggage stream width. Each vertical belt drive means may also be a equipped with a variable speed motor or variable speed drive. A preferred variable speed drive is a variable frequency drives which provide for both variable speed and belt direction control in a single device for the vertical belts.

The position sensor can be positioned at the infeed end of the baggage positioner and can consist of an array of photo sensors mounted on a sensor rack. Reflective photo sensors, background suppression type photo sensors, a photo array light curtain, a laser volume measurement system, an ultrasonic volume measurement system or other position sensor means known in the art for sensing the position and other data for each baggage item at the infeed end of the baggage positioner could be used. Other position sensing means will likely be developed in the art in the future which could be deployed for the present invention.

Data obtained by the position sensor is used by the positioning arm controller in determining when to actuate each of the vertical belts and which direction to turn the belt to provide for the desired repositioning of the baggage item so that it will pass through a restricted opening of baggage inspection equipment or otherwise be repositioned to a maximum baggage stream width without jamming. The position sensor data can also be used to determine the respective speeds of the vertical belts if the vertical belts are equipped with a vertical belt variable speed drive.

The vertical slide of the positioning arms may be equipped with slide springs and one or more pressure sensors so that when a baggage item collides with the vertical belt and presses the vertical slide it actuates one or more of the pressure sensors. Pressure sensor activation is communicated to the positioning arm controller and is used to assist in the determination of the direction of movement, or direction and speed of movement, of the vertical belt to effect the appropriate repositioning of the baggage item. Although a set of pressure sensors used with a spring loaded vertical slide as described above is preferred by the inventor for sensing the time of and position of impact of a baggage item with a respective positioning arm, other positioning arm impact sensing means are known in the art and can be used.

As stated above, a primary objective of the present invention is to prevent or reduce jamming of conveyor belt baggage feed to automated baggage inspection equipment and in particular to EDS systems at airports. At the time of submission of this application there are two primary EDS systems in use at airports. One of these systems has a baggage entrance which is 25 inches wide and 19 inches high. The other system has two sets of limits. If the baggage item is 16 inches or less in height then it can have a maximum width of 29 inches. If, on the other hand, it has a height more than 16 inches but less than 21.5 inches, it can have a maximum width of no greater than 21.5 inches. Other types of baggage inspection equipment and other baggage handling operations may require positioning baggage for reducing the baggage stream width by various amounts thereby requiring more than one discharge width for the positioning arms. The baggage stream width is the maximum lateral width between opposing sides of the baggage stream.

A preferred embodiment of the present invention which provides for jam prevention or reduction for baggage feed to EDS equipment with more than one discharge width requirement and may be used for other equipment or applications requiring varying reductions in the baggage stream width, includes an arm pivot mechanism. This application discloses an arm pivot mechanism that has been found by the inventor to be particularly stable and reliable and provides for the rapid change of the discharge width that is required for embodiments providing baggage feed to equipment having varying width limitations depending on the height of the baggage item. This embodiment of the arm pivot mechanism comprises a pivot motor, pivot drive, pivot cam, central push rod, a pair of opposing lateral push rods, a central pivot slide, central slide track, a pair of opposing lateral slides, and a pair of opposing lateral slide tracks.

For embodiments which provide for varying the discharge width, the position sensor may also include two lateral sensors, a lower lateral and an upper lateral sensor. The lower lateral sensor determines if a baggage item is taller than the maximum allowable height for the full width feed of the EDS equipment and the upper lateral sensor determines if a baggage item is taller than the maximum allowable height for the reduced width equipment feed. If the lateral sensors determine that a baggage item has a height which is less than the maximum allowable height for the wider EDS equipment feed opening, then the positioning arms are moved to or maintained at the full open position by the positioning arm controller. If the baggage item is determined to have a height greater than the maximum height for the full width EDS equipment opening but less than the maximum height for the reduced width EDS equipment opening, the positioning arms are moved to or maintained at a minimum discharge width position by the positioning arm controller. If the upper lateral position sensor determines that the height of the baggage item exceeds the maximum height of the restricted width opening of the EDS equipment opening, then the baggage feed conveyor and the baggage positioner are shut down by the positioning arm controller and an alarm activated.

Similarly, for a fixed positioning arm embodiment of the baggage positioner, a single lateral sensor is used to determine if the maximum height of the baggage for entry into the EDS equipment opening is exceeded. If so, the feed conveyor and the baggage positioner are shut down by the positioning arm controller and an alarm is actuated.

Also, vertical sensors are used to determine if the maximum allowed width of the baggage item is exceeded. If the maximum width is exceeded, again the feed conveyor and the baggage positioner are shut down by the positioning arm controller and an alarm is actuated.

A movement monitor sensor can also be used for the embodiments shown to monitor horizontal belt movement and therefore the movement of baggage items upon the horizontal belt. This provides additional data to the positioning arm controller for use in repositioning baggage items. Like the vertical belt pressure sensors, the movement monitor data is used by the positioning arm controller to enhance the effectiveness of the positioning arm vertical belt and arm pivot movements in repositioning baggage items.

A leading edge sensor can also be used to look laterally across the infeed end of the horizontal conveyor to sense the leading edge of each baggage item entering the baggage positioner, to assist in the tracking of the baggage item through the baggage positioner, to assist in the determination of baggage item length and to assist in the determination of baggage item trailing edge location.

A discharge end sensor may also be used to detect the leading edge and the trailing edge of the baggage item as it exits the baggage positioner. This data is used by the positioning arm controller to detect baggage jamming, baggage clear and trailing to leading edge clearance for successive baggage items moving through the discharge opening to an EDS device or other down stream equipment.

Data from the movement monitor sensor, the leading edge sensor, the discharge end sensor, and the pressure sensors are used by the positioning arm controller to enhance and optimize the effectiveness of the baggage positioner, both for the fixed positioning arm and the pivoting positioning arm embodiments.

The positioning arm controller, based upon the input data, determines when to turn the respective vertical belts on and off and determines the direction of movement of the respective vertical belts. The belt speed of the horizontal conveyor and/or each vertical belt can also be controlled by the positioning arm controller. However, in the interest of maximum flexibility of operation and maintenance, the inventor prefers variable speed drives for the horizontal conveyor and the vertical belts. A preferred embodiment for a variable speed drive is a variable frequency drive. A variable frequency drive provides for both speed variation and direction variation as needed for the vertical belts.

A preferred embodiment of the positioning arm controller includes a remote operation terminal which receives data from the position sensor as well as the movement monitor sensor, the leading edge sensor, the discharge sensor, and the pressure sensors it they are included. Communication between the foregoing sensors and the operation terminal can be by wire or wireless. The operation terminal includes a control computer and one or more user input devices for the user to interact with the control computer. The interaction may be as simple as turning the baggage positioner on or off or may include selection of settings for maximum and minimum discharge widths, maximum baggage heights, reaction times for discharge width adjustments, horizontal belt speeds, vertical belt speeds and other operational settings. The control computer receives the data from the sensors and, through the use of a positioning program, determines the time for activating a respective vertical belt, a desired direction for the belt and the time for deactivating the belt. It may also determine the speed of the vertical belt. The control computer may also vary the discharge width between the discharge ends of the positioning arms and the speed of the horizontal belt.

The positioning program may also be stored on a central baggage handling computer. A simplified embodiment of the positioning arm controller with an integral control computer containing the positioning program may be mounted on the support structure or may be located nearby at a location providing for vibration or environmental isolation while maintaining ready access from the baggage positioner location. The settings may be pre-programmed for the particular installation and use.

Alternative embodiments of the present invention may provide that the positioning arm control system is not included. For these embodiments, the positioning arms are merely provided with control input means, which provides for an independent positioning arm controller to communicate with any sensors that are used for the installation and with the positioning arms. The control input means can be as simple as a cable jack for communication by wire or can be a FM or microwave transmitter and receiver for wireless communication.

DETAILED DESCRIPTION

As indicated above, for purposes of this application the term "baggage" shall be defined to be either passenger baggage items or air freight items or a combination thereof and the term "baggage item" shall be defined to be either a passenger baggage item or an air freight item. "Repositioning" of a baggage item may include lateral displacement of the geometric center of the baggage item or may include reorienting of the baggage item by rotation of the baggage item about its geometric center, or both. The term "position" as used with regard to a baggage item, shall be deemed to include lateral location and orientation on a horizontal conveyor belt, unless stated otherwise.

Figure 1:
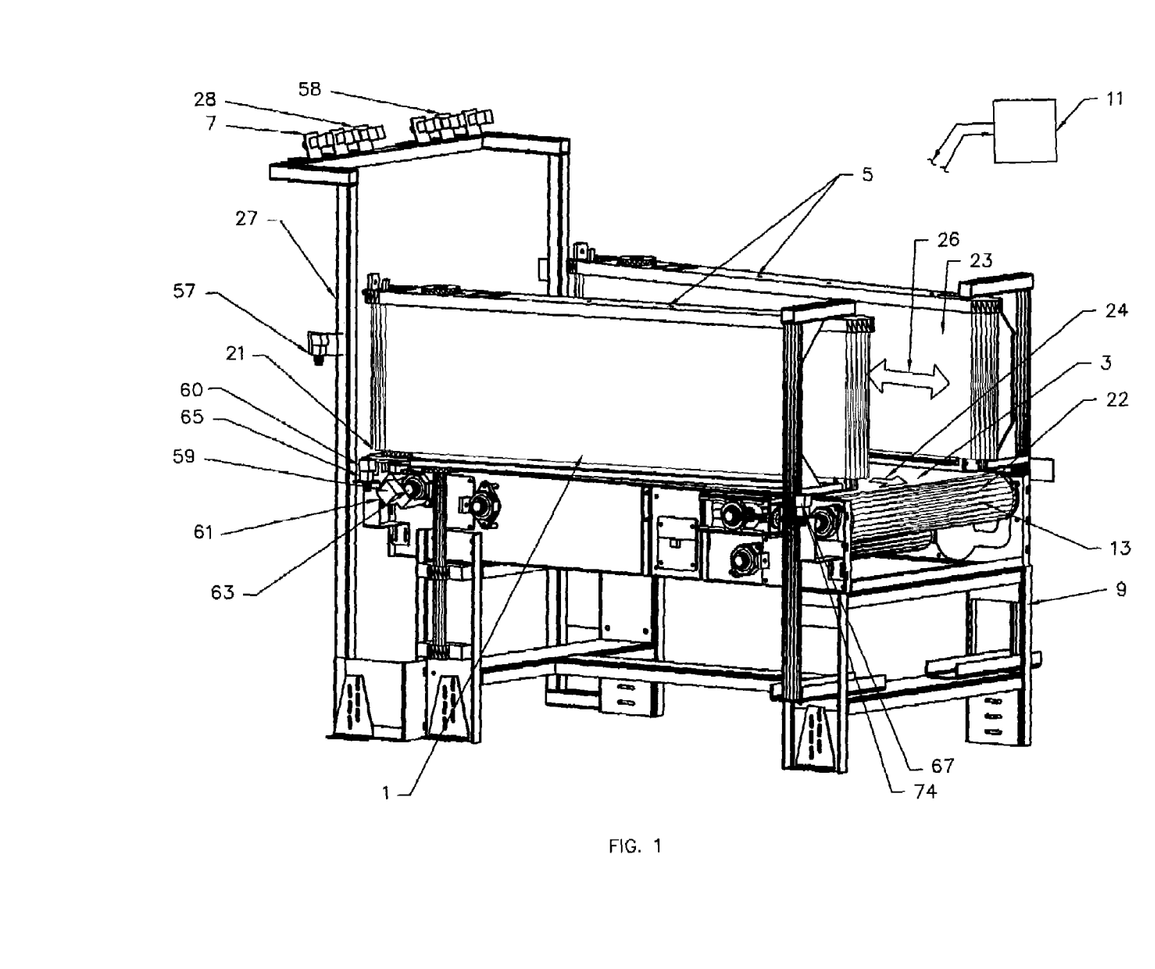
FIG. 1 is a rear view perspective of a preferred embodiment of the baggage positioner of the present invention with fixed positioning arms.

Referring to FIG. 1, a preferred embodiment of the baggage positioner 1 of the present invention is shown. This preferred embodiment is comprised of a horizontal conveyor 3, a pair of opposing positioning arms 5, position sensor 7, support structure 9, and positioning arm controller 11 which is linked to the position sensor and the positioning arms.

Figure 3:
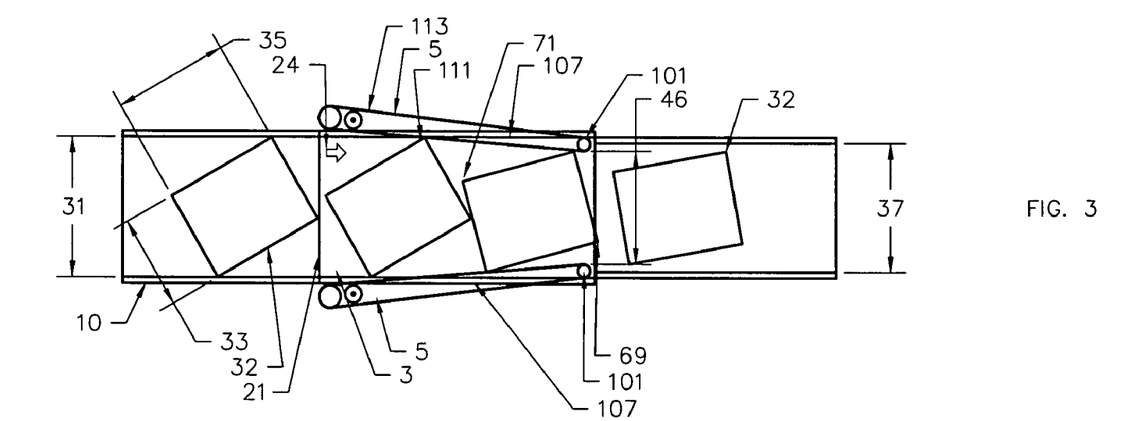
FIG. 3 is a plan view of an embodiment of the baggage positioner of the present invention in a maximum discharge width configuration illustrating repositioning of a baggage item.
Figure 4:
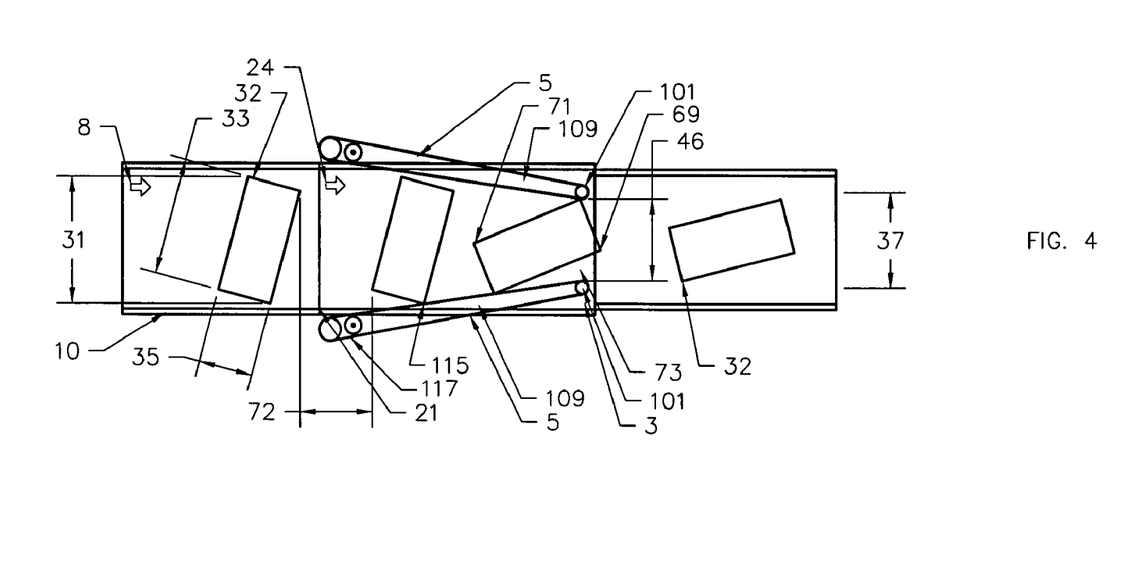
FIG. 4 is a plan view of an embodiment of the baggage positioner of the present invention in a minimum discharge width configuration illustrating repositioning of a baggage item.

The horizontal conveyor will preferably be a typical conveyor belt with a horizontal belt drive means known in the art and will have a belt drum 13 at the horizontal conveyor infeed end 21 and the horizontal conveyor discharge end 22. A horizontal slide (not shown) is typically required beneath the horizontal belt to support the belt and the baggage to prevent sagging and stretching of the belt. The horizontal belt drive means may have a fixed speed thereby providing for a fixed and known horizontal conveyor belt speed or may be equipped with a variable speed drive which may also communicate with the positioning arm controller thereby providing for user selected or automated variation in the speed 24 of the horizontal belt. A variable frequency drive is preferred by the inventor for a horizontal conveyor variable speed drive means. Referring also to FIGS. 3 and 4, the speed of the horizontal belt will generally need to be equal to or greater than the speed 8 of the feed conveyor 10 delivering baggage to the baggage positioner.

The positioning arms 5, for the embodiment shown, each have a vertical belt 23 with a vertical belt bi-directional drive means, which typically will utilize a motor, drive, drums, and a tension mechanism, all of which are known in the art. An automated switch can be used to reverse the motor or the drive to provide for changing the direction of belt movement, providing for bi-directional movement 26 of each of the vertical belts. The vertical belt bi-directional drive means communicates with the positioning arm controller, which independently operates each vertical belt, turning each on and off and determining the direction of movement of each belt as needed to position baggage items for passage through a restricted inspection device opening or to other device or belt for which a reduced baggage stream width is required. Each vertical belt drive means may also be a equipped with a variable speed motor or variable speed drive which will provide not only for bi-directional movement of the vertical belts but will also provide for variable speed of the respective vertical belts as determined by the positioning arm controller. For economy and ease of operation and maintenance, the inventor prefers variable frequency drives which provide for both variable speed and belt direction control in a single device for the vertical belts.

The embodiment of the position sensor 7 shown in FIG. 1 is positioned at the infeed end 21 of the baggage positioner and consists of an array of photo sensors 28 mounted on a sensor rack 27 of the support structure 9. For economy, the inventor prefers reflective photo sensors, but background suppression type photo sensors or a photo array light curtain could be used. Further a laser volume measurement system, an ultrasonic volume measurement system or other position sensor means known in the art for sensing the orientation, lateral location, dimension or other position or geometric data for each baggage item as it approaches the infeed end of the baggage positioner could be used. Other position sensing means will likely be developed in the art in the future which could be deployed for the present invention.

The position sensor provides position sensor data to the positioning arm controller. Position sensor data can include baggage item lateral location data, baggage item orientation data, baggage item dimension data and baggage item longitudinal location data. Referring to FIGS. 3 and 4, for a preferred embodiment the position sensor data is used by the positioning arm controller to determine the lateral width 31 of the baggage item 32. The position sensor data may also be used by the positioning arm controller to determine the horizontal dimensions 33, 35 baggage item. The position sensor data could further be used by the positioning arm controller to determine the speed of the baggage item as it approaches the infeed end of the baggage positioner on the feed conveyor. Position sensor data obtained by the position sensor is then used by the positioning arm controller in determining when to actuate each of the vertical belts and which direction to turn the belt to provide for the desired repositioning of the baggage item so that it will pass through a restricted opening of baggage inspection equipment or otherwise be repositioned to a maximum baggage stream width 37 without jamming. The position sensor data can also be used to determine the respective speeds of the vertical belts if the vertical belts are equipped with a vertical belt variable speed drive.

Figure 5:
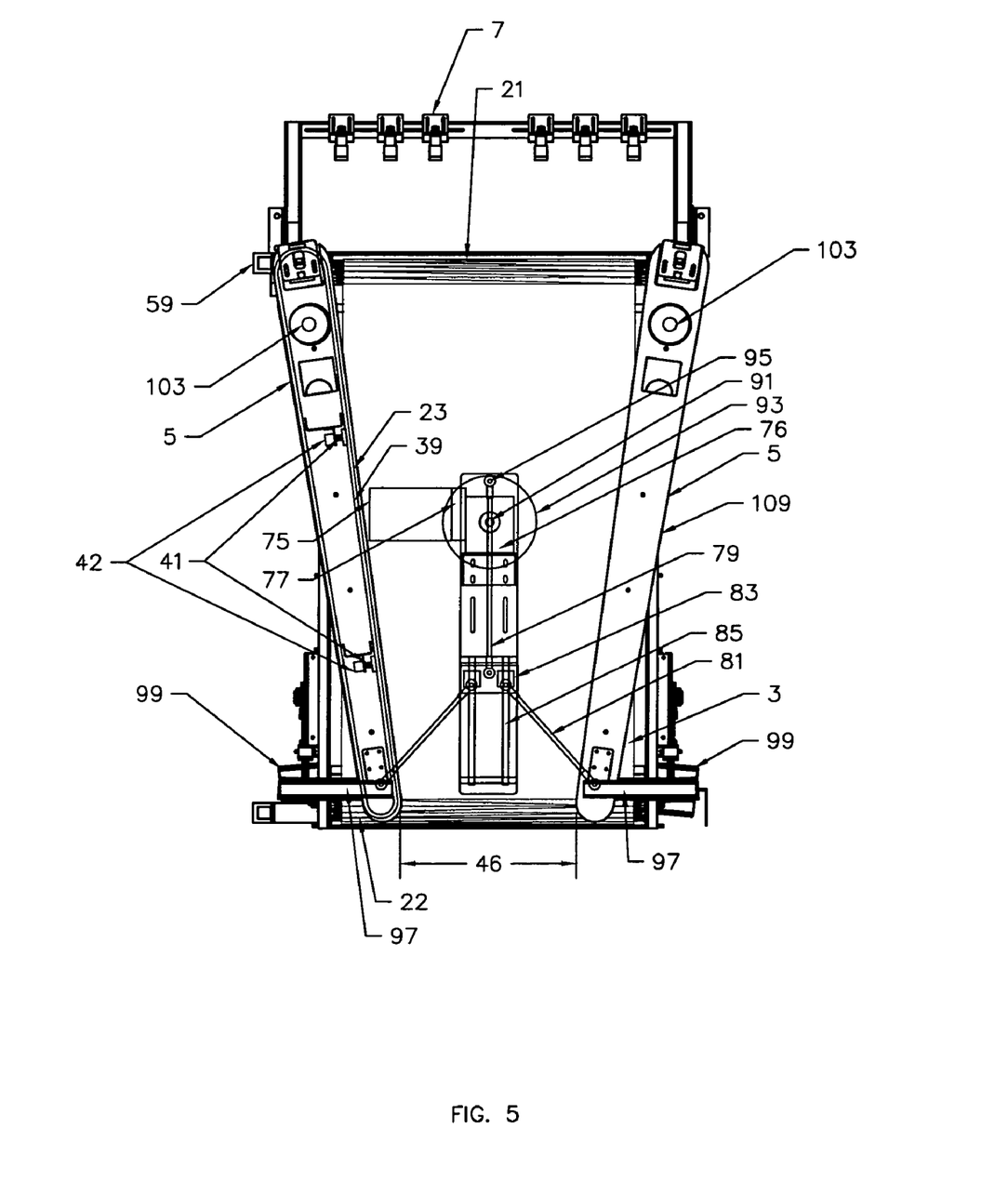
FIG. 5 is a plan view of a preferred embodiment of the baggage positioner of the present invention illustrating the positioning arm pressure sensors and spring loaded vertical slide and illustrating a preferred embodiment of a positioning arm pivot mechanism.
Figure 7:
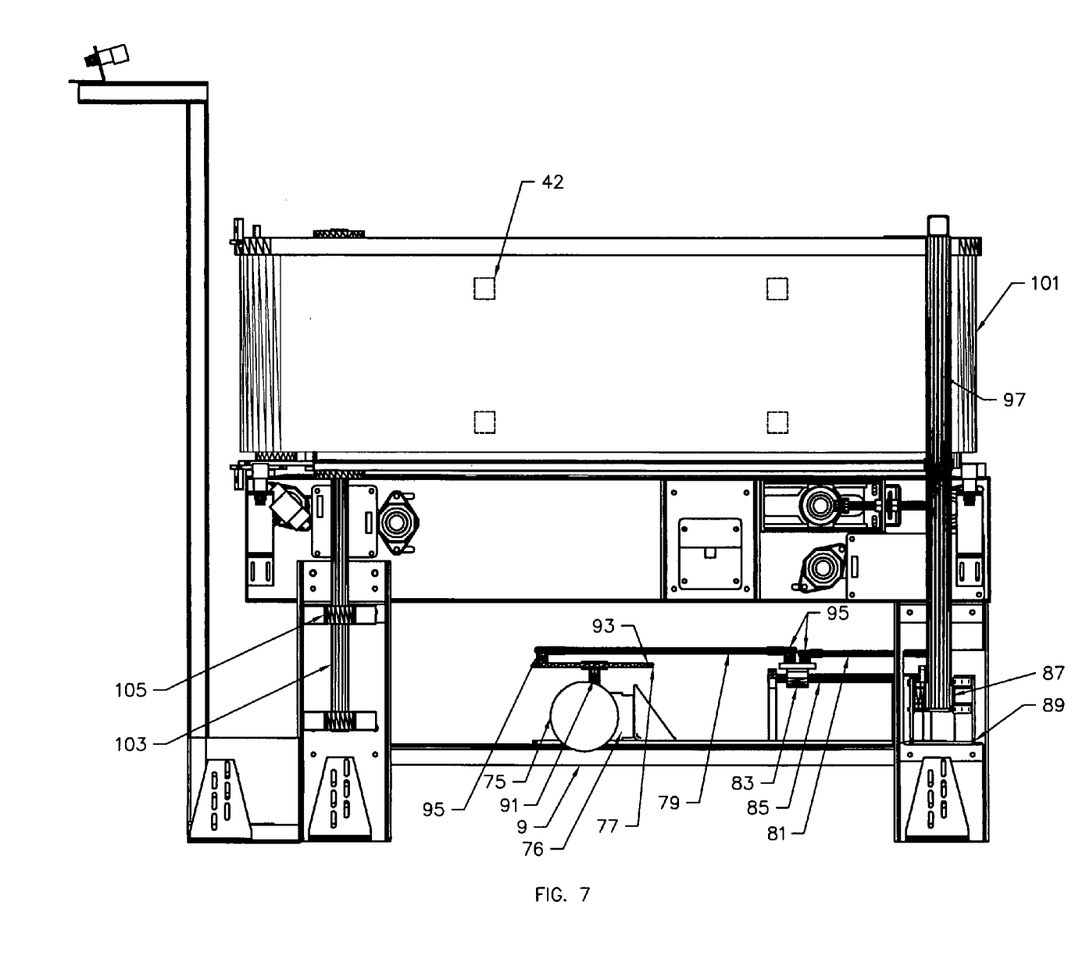
FIG. 7 is a side view of a preferred embodiment of the baggage positioner of the present invention with pivoting positioning arms, showing a preferred embodiment of a positioning arm pivot mechanism.

Referring now to FIG. 5, the vertical slide 39 of the positioning arms may be equipped with slide springs 41 and one or more pressure sensors 42 so that when a baggage item collides with the vertical belt and presses the vertical slide it actuates one or more of the pressure sensors. The inventor has found that four sensors symmetrically spaced in the positioning arm as illustrated in FIG. 7 is a preferred embodiment but a lessor or greater number can be used. Pressure sensor activation is communicated to the positioning arm controller and is used to assist in the determination of the direction of movement, or direction and speed of movement, of the vertical belt to effect the appropriate repositioning of the baggage item. Although a set of pressure sensors used with a spring loaded vertical slide as described above is preferred by the inventor for sensing the time of and position of impact of a baggage item with a respective positioning arm, other positioning arm impact sensing means are known in the art and can be used.

As stated above, a primary objective of the present invention is to prevent or reduce jamming of conveyor belt baggage feed to automated baggage inspection equipment and in particular to EDS systems at airports. At the time of submission of this application there are two primary EDS systems in use at airports. One of these systems has a baggage entrance which is 25 inches wide and 19 inches high. The other system has two sets of limits. If the baggage item is 16 inches or less in height then it can have a maximum width of 29 inches. If, on the other hand, it has a height more than 16 inches but less than 21.5 inches, it can have a maximum width of no greater than 21.5 inches. Other types of baggage inspection equipment and other baggage handling operations may require positioning baggage for reducing the baggage stream width by various amounts thereby requiring more than one discharge width for the positioning arms. The baggage stream width is the maximum lateral width between opposing sides of the baggage stream.

Figure 2:
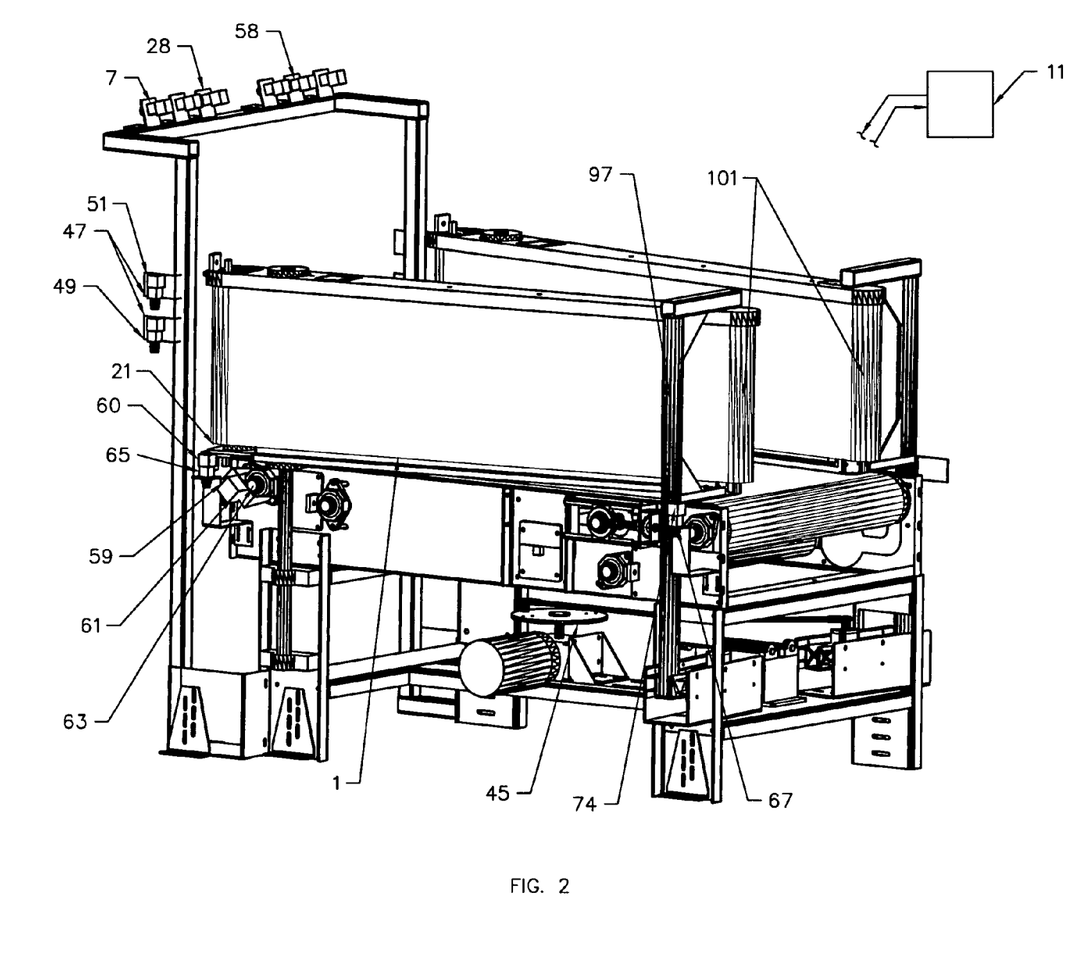
FIG. 2 is a rear view perspective of a preferred embodiment of the baggage positioner of the present invention with pivoting positioning arms.
Figure 6:
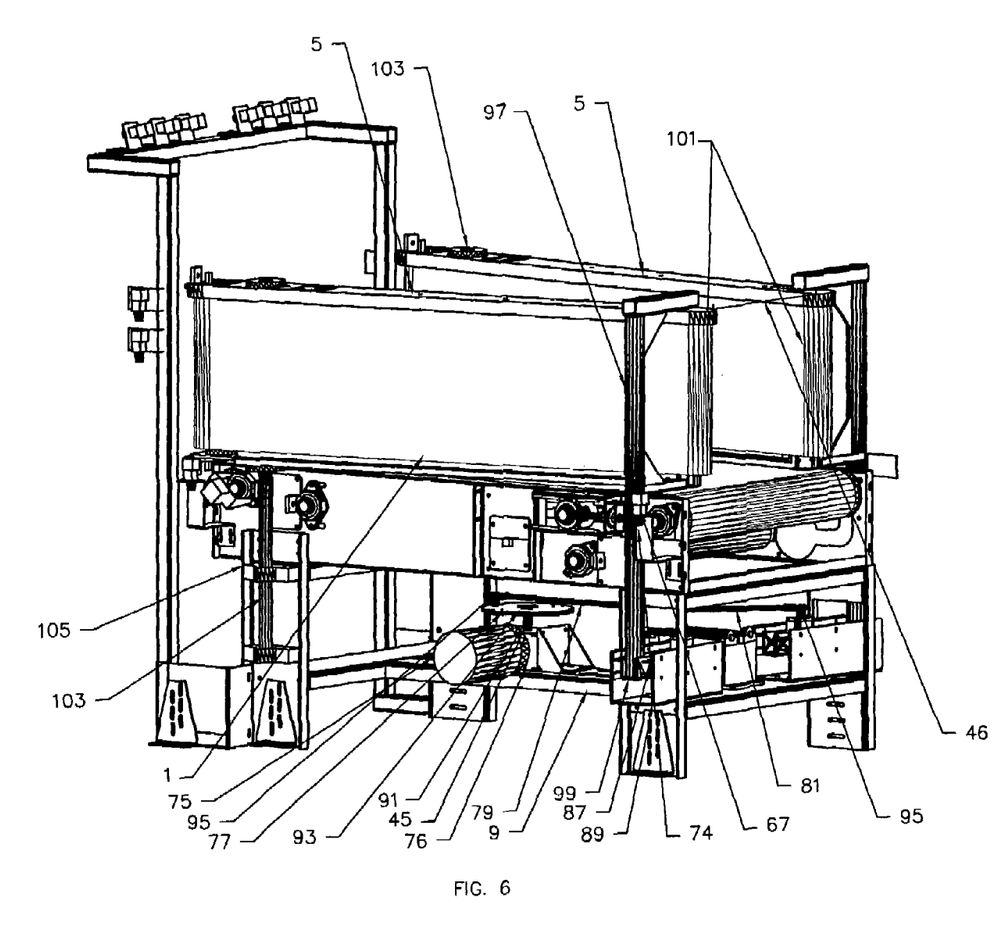
FIG. 6 is a rear view perspective of a preferred embodiment of the baggage positioner of the present invention with pivoting positioning arms, showing a preferred embodiment of a positioning arm pivot mechanism.

Referring to FIG. 2, a preferred embodiment of the present invention is shown which provides for jam prevention or reduction for baggage feed to EDS equipment with more than one discharge width requirement and may be used for other equipment or applications requiring varying reductions in the baggage stream width. This embodiment includes the arm pivot mechanism 45 as shown in FIGS. 5, 6 and 7 or may incorporate some other arm pivot means such as a variable and lockable upstream pivot shaft or other arm pivot means known in the art. The arm pivot mechanism shown in FIGS. 5, 6 and 7 has been found by the inventor to be particularly stable and reliable and provides for the rapid change of the discharge width 46 that is required for embodiments providing baggage feed to equipment having varying width limitations depending on the height of the baggage item. This embodiment of the arm pivot mechanism 45 comprises a pivot motor 75, pivot drive 76, pivot cam 77, central push rod 79, a pair of opposing lateral push rods 81, a central pivot slide 83, central slide track 85, a pair of opposing lateral slides 87, and a pair of opposing lateral slide tracks 89. Pivot joints 95 are used to connect the pivot cam to the central push rod, the central push rod to the central slide, the central slide to the lateral push rods respectively and the lateral push rods respectively to the lateral slides.

Referring also to FIGS. 3 and 4 respectively, the positioning arms 5 are shown in a maximum discharge width configuration 107 in FIG. 3 and in a minimum discharge width configuration 109 in FIG. 4. The pivot motor communicates with the positioning arm controller and activates the pivot drive based upon signals from the positioning arm controller to change the discharge width as needed for a baggage item. The pivot drive is connected to the pivot cam by a pivot drive shaft 91 which rotates the cam from the minimum discharge width position 93 shown in FIGS. 6 and 7 through 180 degrees to a maximum discharge width position. By selection of appropriate lengths for the central push rod and the lateral push rods, the desired discharge width between the discharge ends of the positioning arms can be obtained for the respective maximum discharge width and minimum discharge width positions of the pivot cam. Alternatively, if more than two options of the discharge width are needed, the pivot cam can be rotated to any position as controlled by the positioning arm controller to generate a desired discharge width.

As the pivot cam is rotated from the minimum discharge width position 93, the central slide 83 is moved on the central slide track 85 toward the discharge end, which results in the respective lateral slides 87 being moved along the respective lateral slide tracks 89 toward the outside end 99 of the respective lateral slide track. Each lateral slide is connected to a respective positioning arm by a respective arm support member 97. The arm support members move the discharge ends 101 of the positioning arms apart as the lateral slides are moved toward their respective outside ends. Each lateral slide track is curved with the radius of curvature equal to the distance from the slide tracks to the upstream pivot shaft 103. Each positioning arm is supported on the upstream end by the upstream pivot shaft which, through the use of one or more pivot bearings 105, also provides for the rotation of the positioning arm about the upstream pivot shaft as the lateral slide moves on the lateral slide track. The central slide track, the lateral slide tracks, and the upstream pivot shafts are anchored to the support frame.

For the preferred embodiment shown in FIG. 2, the position sensor preferably includes two lateral sensors 47. The lower lateral sensor 49 determines if a baggage item is taller than the maximum allowable height for the full width feed of the EDS equipment and the upper lateral sensor 51 determines if a bag is taller than the maximum allowable height for the reduced width equipment feed. If the lateral sensors determine that a baggage item has a height which is less than the maximum allowable height for the wider EDS equipment feed opening, then the positioning arms are moved to or maintained at the full open position by the positioning arm controller. If the baggage item is determined to have a height greater than the maximum height for the full width EDS equipment opening but less than the maximum height for the reduced width EDS equipment opening, the positioning arms are moved to or maintained at a minimum discharge width position 109 as shown in FIGS. 3 and 5 by the positioning arm controller. If the upper lateral position sensor determines that the height of the baggage item exceeds the maximum height of the restricted width opening of the EDS equipment opening, then the baggage feed conveyor 10 and the baggage positioner 1 are shut down by the positioning arm controller and an alarm activated.

Similarly, for the single width, fixed positioning arm embodiment of the baggage positioner of the present invention shown in FIG. 1, a single lateral sensor 57 is used to determine if the maximum height of the baggage for entry into the EDS equipment opening is exceeded. If so, the feed conveyor and the baggage positioner are shut down by the positioning arm controller and an alarm is actuated.

Also, the vertical sensors 58, are used to determine if the maximum allowed width of the baggage item is exceeded. For both of the embodiments shown in FIG. 1 and in FIG. 2, if the maximum width is exceeded, again the feed conveyor and the baggage positioner are shut down by the positioning arm controller and an alarm is actuated.

A movement monitor sensor 59 can also be used for the embodiments shown in FIG. 1 and FIG. 2 to monitor horizontal belt movement and therefore the movement of baggage items upon the horizontal belt. This provides additional data to the positioning arm controller for use in repositioning baggage items. The embodiment of the movement monitor sensor shown in FIG. 1 and FIG. 2 is an optical encoder 61 which is mechanically coupled to the horizontal conveyor infeed end drum shaft 63. An optical encoder will typically generate a square wave pulse signal to the positioning arm controller for each revolution of the horizontal conveyor infeed end drum shaft, thereby allowing a determination of speed of the horizontal belt and the baggage item's position thereon. Like the vertical belt pressure sensors, the movement monitor data is used by the positioning arm controller to enhance the effectiveness of the positioning arm vertical belt and arm pivot movements in repositioning baggage items. Other horizontal belt movement monitor means which are known in the art could be used. This could include a proximity sensor looking at a sprocket on the infeed end drum, a tachometer pressing against the conveyor belt or some other similar method known in the art.

A leading edge sensor 60 can also be used for the embodiments shown in FIG. 1 and FIG. 2. The leading edge sensor "looks" laterally across the infeed end 21 of the horizontal conveyor. This sensor senses the leading edge of each baggage item entering the baggage positioner, assists in the tracking of the baggage item through the baggage positioner, allows the determination of baggage item length and allows the determination of baggage item trailing edge location. The data from this sensor can be used by the positioning arm controller with data from a movement monitor sensor 61 to determine the length of the baggage item. The embodiment of the leading edge sensor shown in FIG. 1 and FIG. 2 is a photo sensor 65 positioned at the infeed end of the horizontal conveyor, but other types of leading edge sensing means known in the art could be used.

Referring also to FIG. 3 and FIG. 4, a discharge end sensor 67 may also be used to detect the leading edge 69 and the trailing edge 71 of the baggage item as it exits the baggage positioner. This data is used by the positioning arm controller to detect baggage jamming, baggage clear and trailing to leading edge clearance 72 for successive baggage items moving through the discharge opening 73 to an EDS device or other down stream equipment. Again a sensor preferred by the inventor for the discharge end sensor is the photo sensor 74 shown but other devices known in the art could be used for a discharge end sensor means.

Data from the movement monitor sensor, the leading edge sensor, the discharge end sensor, and the pressure sensors are used by the positioning arm controller to enhance and optimize the effectiveness of the baggage positioner, both for the fixed positioning arm embodiment shown in FIG. 1 and the pivoting positioning arm embodiment as shown in FIG. 2.

The positioning arm controller, based upon the input data, determines when to turn the respective vertical belts on and off and determines the direction of movement of the respective vertical belts. The belt speed of the horizontal belt and/or each vertical belt can also be controlled by the positioning arm controller. However, in the interest of maximum flexibility of operation and maintenance, the inventor prefers variable speed drives for the horizontal conveyor and the vertical belts. A preferred embodiment for a variable speed drive is a variable frequency drive. A variable frequency drive provides for both speed variation and direction variation as needed for the vertical belts.

Referring to FIGS. 3 and 4, the movement of a baggage item 32 through the baggage positioner and the repositioning of the baggage item so that it will pass between the discharge ends 101 of the respective positioning arms 5 is shown. FIG. 3 illustrates a left front corner 111 of a baggage item impacting the left positioning arm 113 with the positioning arms in a maximum discharge width configuration 107 and the left positioning arm vertical belt propelling the left corner forward and inward, thereby repositioning the baggage item so that it can pass between the downstream ends of the positioning arms in a baggage stream with a baggage stream width that is equal to the discharge width 46. The direction of the vertical belt movement was determined by the positioning arm controller based upon data from the sensors. FIG. 4 illustrates a right front corner 115 of a baggage item impacting the right positioning arm 117 with the positioning arms in a minimum discharge width configuration 109 and the right positioning arm vertical belt propelling the right corner rearward, thereby repositioning the baggage item so that it can pass between the downstream ends of the positioning arms in a baggage stream with a baggage stream width that is equal to the discharge width 46. Again, the direction of the vertical belt movement was determined by the positioning arm controller based upon data from the sensors.

Figure 8:
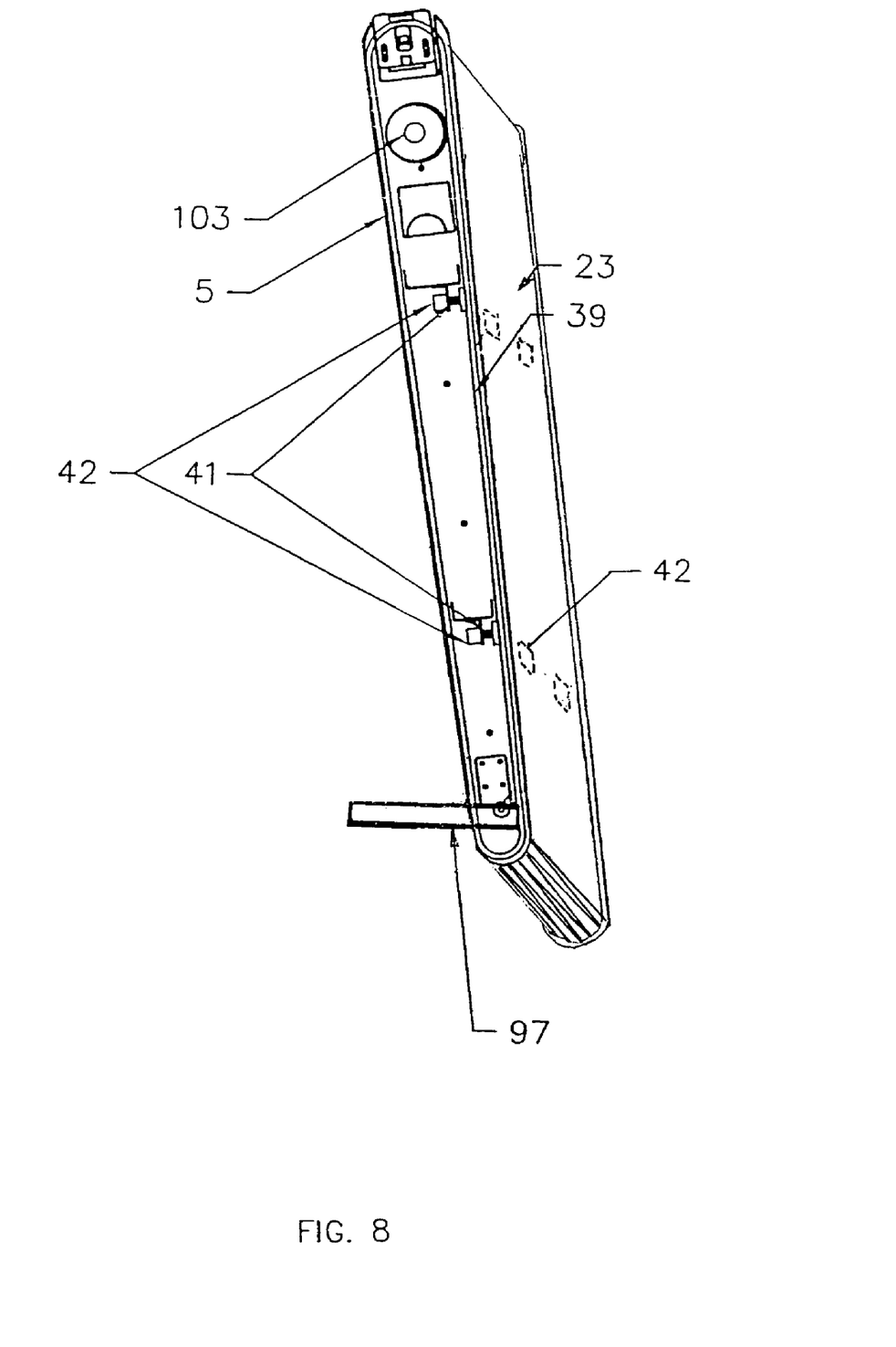
FIG. 8 is a plan view perspective detail of a preferred embodiment of a baggage positioner arm of the present invention with positioning arm pressure sensors.

Referring now to FIG. 8, an embodiment of a positioning arm 5 of the present invention is shown. The positioning arm shown in FIG. 8 with positioning arm impact sensing means comprising positioning arm pressure sensors 42 is also illustrated in FIG. 5 and FIG. 7. Other positioning arm impact sensing means are known in the art and can be used. Referring also to FIGS. 3–4, while the positioning arm shown is a right positioning arm 115, the mirror image of this positioning arm is the left positioning arm 113 shown in FIGS. 1–7. The arm pivot means shown in FIGS. 5–7 and described above can be used with the positioning arm shown in FIG. 8 in the manner illustrated in FIGS. 5–7. The pivot mechanism 45 as shown in FIGS. 5–7 may be used or some other arm pivot means such as a variable and lockable upstream pivot shaft or other arm pivot means known in the art may be used with this embodiment.

A preferred embodiment of the positioning arm controller includes a remote operation terminal which receives data from the position sensor as well as the movement monitor sensor, the leading edge sensor, the discharge sensor, and the pressure sensors it they are included. Communication between the foregoing sensors and the operation terminal can be by wire or wireless. The operation terminal includes a control computer and one or more user input devices for the user to interact with the control computer. The interaction may be as simple as turning the baggage positioner on or off or may include selection of settings for maximum and minimum discharge widths, maximum baggage heights, reaction times for discharge width adjustments, horizontal belt speeds, vertical belt speeds and other operational settings. The control computer receives the data from the sensors and, through the use of a positioning program, determines the time for activating a respective vertical belt, a desired direction for the belt and the time for deactivating the belt. It may also determine the speed of the vertical belt. The control computer may also vary the discharge width between the discharge ends of the positioning arms and the speed of the horizontal belt. Communication with the respective vertical belt drive means, the arm pivot means, and the horizontal conveyor drive means can be by wire or wireless. Typically interface relays mounted on the support structure link the control computer to the vertical belt drive means, the pivot means, and the horizontal conveyor drive means. The positioning program may also be stored on a central baggage handling computer which will serve as the control computer and communicate by Internet or network with the sensors, the positioning arms and the horizontal conveyor. A simplified embodiment of the positioning arm controller with an integral control computer containing the positioning program may be mounted on the support structure with settings pre-programmed for the particular installation and use. The baggage positioner then only requires proper placement and connection to a power supply and operation consists of turning the baggage positioner on and off. Alternatively, such a simplified embodiment of the positioning arm controller may be located nearby at a location providing for vibration or environmental isolation while maintaining ready access from the baggage positioner location.

Alternative embodiments of the present invention may provide that the positioning arm control system is not included. For these embodiments, the positioning arms are merely provided with control input means, which provides for an independent positioning arm controller to communicate with any sensors that are used for the installation and with the positioning arms. The control input means can be as simple as a cable jack for communication by wire or can be a transmitter and receiver for wireless communication. Other control input means are known in the art.

For preferred embodiments, the inventor prefers that a smooth fabric belt be used for the horizontal belt. This allows a baggage item to slide easily on the horizontal belt as it is being repositioned. However, the inventor has found that the present invention will function acceptably with horizontal belts having a somewhat higher friction surface, including belts referred to in the industry as "FS" belts. However, this will likely increase the incidence of jamming somewhat. A modular belt, which typically may be constructed of slats ranging from about one-half inch to two inches in width, may also be used for the horizontal belt. Depending on the material used for the surface of the slats, modular belts typically provide for adequate slippage for repositioning. Also, while driven rollers generally can not be used for passenger baggage, they can be used instead of a belt for air freight, as rollers will generally provide for adequate slippage for repositioning. Again this will depend on the material used for the roller surface. For brevity, the term "horizontal conveyor" used in the claims and elsewhere in this application shall include a conveyor with a fabric belt or a modular belt, a conveyor with driven rollers, or other similar horizontal driven conveyance mechanisms known in the art.

For certain applications of the present invention, a longitudinal slope on the horizontal belt may be desirable. For applications using a smooth surface belt, the slope is generally limited to approximately ten or twelve degrees. With an FS surface, the slope can be increased to approximately fifteen degrees. Since eighteen degrees is generally the recommended maximum and twenty two degrees is the absolute maximum for the longitudinal slope of a baggage conveyor due to the tendency of baggage to roll if the slope is too high, the present invention is generally adaptable to most slope applications that may be encountered. For brevity, the term "horizontal conveyor" used in the claims and elsewhere in this application shall include horizontal embodiments of the horizontal conveyor and embodiments which are roughly horizontal but which are sloped for the application as described above.

The vertical belt for the positioning arms may also be a smooth fabric belt, an FS belt, a high friction belt, or a modular belt. The inventor prefers a modular belt with a high friction surface. While slippage is needed on the horizontal belt for repositioning, high friction is preferred on the vertical belts to minimize slippage. A modular belt is preferred for the vertical belts because it eliminates the tracking problem with fabric belts which tend to migrate toward one side or other of the belt drums if the axes of the belts are not alined correctly. This tracking problem is much worse for vertical belts because of the effect of gravity on belt migration. If fabric belts are to be used for the positioning arms, generally a v-belt must be welded to the back of the fabric belt and grooved belt drums used. This is eliminated by the use of a modular belt. Driven rollers can also be used for the positioning arms in lieu of belts for air cargo.

While preferred embodiments of the positioning arms have belt drums which have vertical axes, other embodiments may have belt drums with axes inclined from vertical.

For brevity, the term "vertical belt" used in the claims and elsewhere in this application shall be deemed to include a fabric belt, a modular belt as well as other belts and continuously driveable surfaces known in the art and shall include driven rollers or other vertical conveyance mechanism known in the art. Also, for brevity the term "vertical belt" shall be deemed to include vertical embodiments of the vertical belt and embodiments which are roughly vertical but are inclined from the vertical.

Other objects, features and advantages of the present invention will become apparent from the preceding detailed description considered in connection with the accompanying drawings. It is to be understood, however, that the drawings and the foregoing description are designed as an illustration only and not as a definition of the limits of the invention. Therefore, the foregoing is intended to be merely illustrative of the invention and the invention is limited only by the following claims.

What is claimed is:

1. Positioning arm for use in reducing baggage stream width for a stream of baggage items, the positioning arm comprising a vertical belt with bi-directional vertical belt drive means, control input means, and positioning arm impact sensing means.

2. Positioning arm as recited in claim 1 wherein the positioning arm impact sensing means comprises a spring loaded vertical slide and one or more pressure sensors.

3. Positioning arm as recited in claim 1 further comprising arm pivot means.

4. Positioning arm as recited in claim 1 wherein the bi-directional vertical belt drive means comprises bi-directional vertical belt variable speed drive means.

5. Positioning arm as recited in claim 1 wherein the bi-directional vertical belt drive means incorporates a variable frequency drive.

6. Positioning arm for use in reducing baggage stream width for a stream of baggage items, the positioning arm comprising a vertical belt with bi-directional vertical belt drive means, control input means an upstream pivot shaft and a pivot mechanism.

7. Positioning arm as recited in claim 5 wherein the pivot mechanism comprises a pivot motor, pivot drive, pivot cam, central push rod, lateral push rod, central slide track, central pivot slide slidably mounted on the central slide track, lateral slide track, lateral slide slidably mounted on the lateral slide track, and pivot joints connecting the pivot cam to the central push rod, the central push rod to the central slide, the central slide to the lateral push rod and the lateral push rod to the lateral slide, the pivot mechanism being anchored to the support frame and the positioning arm being connected to the lateral slide by an arm support member.

8. Baggage positioner for reduction of baggage stream width for a baggage stream on a conveyor belt comprising:
   a) pair of positioning arms, each positioning arm having an infeed end and a discharge end, each positioning arm having a vertical belt with bi-directional vertical belt drive means, the infeed end of the respective positioning arms being positioned on opposing sides of the conveyor belt, and the separation of the discharge ends of the respective positioning arms being determined based on the desired baggage stream width reduction;
   b) control input means; and
   c) position sensor comprising a photo array light curtain.

9. Baggage positioner for reduction of baggage stream width for a baggage stream on a conveyor belt comprising:
   a) pair of positioning arms, each positioning arm having an infeed end and a discharge end, each positioning arm having a vertical belt with bi-directional vertical belt drive means, the infeed end of the respective positioning arms being positioned on opposing sides of the conveyor belt, and the separation of the discharge ends of the respective positioning arms being determined based on the desired baggage stream width reduction;
   b) control input means; and
   c) positioning arm impact sensing means.

10. Baggage positioner as recited in claim 9 further comprising a positioning arm controller.

11. Baggage positioner as recited in claim 9 further comprising horizontal belt movement monitor means for the conveyor belt.

12. Baggage positioner as recited in claim 9 wherein the positioning arm impact sensing means comprises a spring loaded vertical slide and one or more pressure sensors in each positioning arm.

13. Baggage positioner as recited in claim 9 further comprising a position sensor.

14. Baggage positioner as recited in claim 13 wherein the baggage positioner has an infeed end and the position sensor is positioned more or less at the infeed end.

15. Baggage positioner as recited in claim 9 further comprising leading edge sensing means.

16. Baggage positioner as recited in claim 15 wherein the leading edge sensing means comprises one or more leading edge sensors.

17. Baggage positioner as recited in claim 16 wherein the leading edge sensors comprise leading edge photo sensors.

18. Baggage positioner as recited in claim 9 wherein the positioning arm impact sensing means comprises one or more pressure sensors in each positioning arm.

19. Baggage positioner for reduction of baggage stream width for a baggage stream on a conveyor belt comprising:
   a) pair of positioning arms, each positioning arm having an infeed end and a discharge end, each positioning arm having a vertical belt with bi-directional vertical belt drive means, the infeed end of the respective positioning arms being positioned on opposing sides of the conveyor belt, and the separation of the discharge ends of the respective positioning arms being determined based on the desired baggage stream width reduction;
   a) control input means; and
   b) position sensor comprising a laser volume measurement system.

20. Baggage positioner as recited in claim 9 wherein the bi-directional vertical belt drive means for each of the positioning arms incorporates a variable frequency drive.

21. Baggage positioner for reduction of baggage stream width for a baggage stream on a conveyor belt comprising:
   a) pair of positioning arms, each positioning arm having an infeed end and a discharge end, each positioning arm having a vertical belt with bi-directional vertical belt drive means, the infeed end of the respective positioning arms being positioned on opposing sides of the conveyor belt, and the separation of the discharge ends of the respective positioning arms being determined based on the desired baggage stream width reduction;
   a) control input means; and
   b) arm pivot means for pivoting each of the positioning arms about a respective infeed end pivot axis, thereby providing for varying the separation of the discharge ends of the positioning arms.

22. Baggage positioner as recited in claim 21 wherein the arm pivot means comprises an upstream pivot shaft and a pivot mechanism.

23. Baggage positioner as recited in claim 22 wherein the pivot mechanism comprises a pivot motor, pivot drive, pivot cam, central push rod, pair of opposing lateral push rods, central slide track, central pivot slide slidably mounted to the central slide track, pair of opposing lateral slide tracks, pair of opposing lateral slides with a respective lateral slide being slidably mounted to a respective lateral slide track, and pivot joints connecting the pivot cam to the central push rod, the central push rod to the central slide, the central slide to the lateral push rods respectively and the lateral push rods respectively to the lateral slides, the pivot mechanism being anchored to the support frame and each positioning arm being connected to a respective lateral slide by a respective arm support member.

24. Baggage positioner as recited in claim 9 wherein the bi-directional vertical belt drive means for each of the positioning arms comprises bi-directional vertical belt variable speed drive means.

25. Baggage positioner for reduction of baggage stream width for a baggage stream on a conveyor belt comprising:
   a) pair of positioning arms, each positioning arm having an infeed end and a discharge end, each positioning arm having a vertical belt with bi-directional vertical belt drive means, the infeed end of the respective positioning arms being positioned on opposing sides of the conveyor belt, and the separation of the discharge ends of the respective positioning arms being determined based on the desired baggage stream width reduction;
   b) control input means; and
   c) horizontal belt movement monitor sensor.

26. Baggage positioner for reduction of baggage stream width for a baggage stream on a conveyor belt comprising:
   a) pair of positioning arms, each positioning arm having an infeed end and a discharge end, each positioning arm having a vertical belt with bi-directional vertical belt drive means, the infeed end of the respective positioning arms being positioned on opposing sides of the conveyor belt, and the separation of the discharge ends of the respective positioning arms being determined based on the desired baggage stream width reduction;
   a) control input means; and
   b) horizontal belt movement monitor comprising an infeed end optical encoder coupled to a drum shaft of the conveyor belt.

27. Baggage positioner for reduction of baggage stream width for a baggage stream on a conveyor belt comprising:
   a) pair of positioning arms, each positioning arm having an infeed end and a discharge end, each positioning arm having a vertical belt with bi-directional vertical belt drive means, the infeed end of the respective positioning arms being positioned on opposing sides of the conveyor belt, and the separation of the discharge ends of the respective positioning arms being determined based on the desired baggage stream width reduction;
   b) control input means; and
   c) horizontal belt movement monitor comprising a proximity sensor keyed to the sprocket of a drum shaft of the conveyor belt.

28. Baggage positioner for reduction of baggage stream width for a baggage stream on a conveyor belt comprising:
   a) pair of positioning arms, each positioning arm having an infeed end and a discharge end, each positioning arm having a vertical belt with bi-directional vertical belt drive means, the infeed end of the respective positioning arms being positioned on opposing sides of the conveyor belt, and the separation of the discharge ends of the respective positioning arms being determined based on the desired baggage stream width reduction;
   a) control input means; and
   b) horizontal belt movement monitor comprising a tachometer.

29. Baggage positioner for reduction of baggage stream width for a baggage stream on a conveyor belt comprising:
   a) pair of positioning arms, each positioning arm having an infeed end and a discharge end, each positioning arm having a vertical belt with bi-directional vertical belt drive means, the infeed end of the respective positioning arms being positioned on opposing sides of the conveyor belt, and the separation of the discharge ends of the respective positioning arms being determined based on the desired baggage stream width reduction;
   b) control input means; and
   c) position sensor comprising one or more vertical position sensors positioned above the baggage stream.

30. Baggage positioner as recited in claim 29 wherein the position sensor further comprises one or more lateral position sensors.

31. Baggage positioner as recited in claim 29 wherein the vertical position sensors are photo sensors.

32. Baggage positioner for reduction of baggage stream width for a baggage stream on a conveyor belt comprising:
   a) pair of positioning arms, each positioning arm having an infeed end and a discharge end, each positioning arm having a vertical belt with bi-directional vertical belt drive means, the infeed end of the respective positioning arms being positioned on opposing sides of the conveyor belt, and the separation of the discharge ends of the respective positioning arms being determined based on the desired baggage stream width reduction;
   b) control input means; and
   c) discharge sensing means for sensing the leading and trailing edge of a baggage item as it exits the baggage positioner, thereby providing baggage clear confirmation and baggage jam alert data to the control input means.

33. Baggage positioner as recited in claim 32 wherein the discharge sensing means comprises one or more discharge sensors.

34. Baggage positioner as recited in claim 33 wherein the discharge sensors comprise discharge photo sensors.

35. Baggage positioner for reduction of baggage stream width for a stream of baggage items from a conveyor belt comprising:

a) horizontal conveyor having an infeed end and a discharge end;
b) pair of positioning arms, each positioning arm having an infeed end and a discharge end, each positioning arm having a vertical belt with bi-directional vertical belt drive means, the infeed end of the respective positioning arms being positioned on opposing sides of the horizontal conveyor, and the separation of the discharge ends of the respective positioning arms being determined based on the desired baggage stream width reduction;
c) support structure for horizontal conveyor and positioning arms;
d) control input means; and
e) position sensor comprising one or more vertical position sensors positioned above the baggage stream.

36. Baggage positioner as recited in claim 35 wherein the position sensor further comprises one or more lateral position sensors.

37. Baggage positioner as recited in claim 35 wherein the vertical position sensors are photo sensors.

38. Baggage positioner for reduction of baggage stream width for a stream of baggage items from a conveyor belt comprising:
a) horizontal conveyor having an infeed end and a discharge end;
b) pair of positioning arms, each positioning arm having an infeed end and a discharge end, each positioning arm having a vertical belt with bi-directional vertical belt drive means, the infeed end of the respective positioning arms being positioned on opposing sides of the horizontal conveyor, and the separation of the discharge ends of the respective positioning arms being determined based on the desired baggage stream width reduction;
c) support structure for horizontal conveyor and positioning arms;
d) control input means; and
e) positioning arm impact sensing means.

39. Baggage positioner as recited in claim 38 further comprising a position sensor.

40. Baggage positioner as recited in claim 38 further comprising a positioning arm controller.

41. Baggage positioner as recited in claim 38 wherein the positioning arm impact sensing means comprises a spring loaded vertical slide and one or more pressure sensors in each positioning arm.

42. Baggage positioner as recited in claim 38 further comprising horizontal belt movement monitor means.

43. Baggage positioner as recited in claim 38 further comprising leading edge sensing means.

44. Baggage positioner as recited in claim 43 wherein the leading edge sensing means comprises one or more leading edge sensors.

45. Baggage positioner as recited in claim 44 wherein the leading edge sensors comprise leading edge photo sensors.

46. Baggage positioner as recited in claim 38 wherein the positioning arm impact sensing means comprises one or more pressure sensors in each positioning arm.

47. Baggage positioner as recited in claim 38 wherein the bi-directional vertical belt drive means for each of the positioning arms comprises bi-directional vertical belt variable speed drive means.

48. Baggage positioner as recited in claim 38 wherein the bi-directional vertical belt drive means for each of the positioning arms incorporates a variable frequency drive.

49. Baggage positioner for reduction of baggage stream width for a stream of baggage items from a conveyor belt comprising:
a) horizontal conveyor having an infeed end and a discharge end;
b) pair of positioning arms, each positioning arm having an infeed end and a discharge end, each positioning arm having a vertical belt with bi-directional vertical belt drive means, the infeed end of the respective positioning arms being positioned on opposing sides of the horizontal conveyor, and the separation of the discharge ends of the respective positioning arms being determined based on the desired baggage stream width reduction;
c) support structure for horizontal conveyor and positioning arms;
d) control input means; and
e) position sensor comprising a photo array light curtain.

50. Baggage positioner for reduction of baggage stream width for a stream of baggage items from a conveyor belt comprising:
a) horizontal conveyor having an infeed end and a discharge end;
b) pair of positioning arms, each positioning arm having an infeed end and a discharge end, each positioning arm having a vertical belt with bi-directional vertical belt drive means, the infeed end of the respective positioning arms being positioned on opposing sides of the horizontal conveyor, and the separation of the discharge ends of the respective positioning arms being determined based on the desired baggage stream width reduction;
c) support structure for horizontal conveyor and positioning arms;
d) control input means;
e) positioning arm controler; and
f) arm pivot means for pivoting each of the positioning arms about a respective infeed end pivot axis, thereby providing for varying the separation of the discharge ends of the positioning arms.

51. Baggage positioner as recited in claim 50 wherein the arm pivot means comprises an upstream pivot shaft and a pivot mechanism.

52. Baggage positioner as recited in claim 51 wherein the pivot mechanism comprises a pivot motor, pivot drive, pivot cam, central push rod, pair of opposing lateral push rods, central slide track, central pivot slide slidably mounted to the central slide track, pair of opposing lateral slide tracks, pair of opposing lateral slides with a respective lateral slide being slidably mounted to a respective lateral slide track, and pivot joints connecting the pivot cam to the central push rod, the central push rod to the central slide, the central slide to the lateral push rods respectively and the lateral push rods respectively to the lateral slides, the pivot mechanism being anchored to the support frame and each positioning arm being connected to a respective lateral slide by a respective arm support member.

53. Baggage positioner for reduction of baggage stream width for a stream of baggage items from a conveyor belt comprising:
a) horizontal conveyor having an infeed end and a discharge end;
b) pair of positioning arms, each positioning arm having an infeed end and a discharge end, each positioning arm having a vertical belt with bi-directional vertical belt drive means, the infeed end of the respective positioning arms being positioned on opposing sides of the horizontal conveyor, and the separation of the discharge ends of the respective positioning arms being determined based on the desired baggage stream width reduction;
c) support structure for horizontal conveyor and positioning arms;
d) control input means; and
e) position sensor comprising a laser volume measurement system.

54. Baggage positioner for reduction of baggage stream width for a stream of baggage items from a conveyor belt comprising:
a) horizontal conveyor having an infeed end and a discharge end;
b) pair of positioning arms, each positioning arm having an infeed end and a discharge end, each positioning arm having a vertical belt with bi-directional vertical belt drive means, the infeed end of the respective positioning arms being positioned on opposing sides of the horizontal conveyor, and the separation of the discharge ends of the respective positioning arms being determined based on the desired baggage stream width reduction;
c) support structure for horizontal conveyor and positioning arms;
d) control input means; and
e) horizontal belt movement monitor sensor.

55. Baggage positioner for reduction of baggage stream width for a stream of baggage items from a conveyor belt comprising:
a) horizontal conveyor having an infeed end and a discharge end;
b) pair of positioning arms, each positioning arm having an infeed end and a discharge end, each positiornng arm having a vertical belt with bi-directional vertical belt drive means, the infeed end of the respective positioning arms being positioned on opposing sides of the horizontal conveyor, and the separation of the discharge ends of the respective positioning arms being determined based on the desired baggage stream width reduction;
c) support structure for horizontal conveyor and positioning arms;
d) control input means; and
e) horizontal belt movement monitor means wherein the horizontal conveyor has an infeed end drum shaft and the horizontal belt movement monitor means comprises an infeed end optical encoder coupled to the infeed end drum shaft.

56. Baggage positioner for reduction of baggage stream width for a stream of baggage items from a conveyor belt comprising:
a) horizontal conveyor having an infeed end and a discharge end;
b) pair of positioning arms, each positioning arm having an infeed end and a discharge end, each positioning arm having a vertical belt with bi-directional vertical belt drive means, the infeed end of the respective positioning arms being positioned on opposing sides of the horizontal conveyor, and the separation of the discharge ends of the respective positioning arms being determined based on the desired baggage stream width reduction;
c) support structure for horizontal conveyor and positioning arms;
d) control input means; and
e) horizontal belt movement monitor means wherein the horizontal conveyor has an infeed end drum with a shaft and a sprocket and the horizontal belt movement monitor means comprises a proximity sensor keyed to the sprocket.

57. Baggage positioner for reduction of baggage stream width for a stream of baggage items from a conveyor belt comprising:
a) horizontal conveyor having an infeed end and a discharge end;
b) pair of positioning arms, each positioning arm having an infeed end and a discharge end, each positioning arm having a vertical belt with bi-directional vertical belt drive means, the infeed end of the respective positioning arms being positioned on opposing sides of the horizontal conveyor, and the separation of the discharge ends of the respective positioning arms being determined based on the desired baggage stream width reduction;
c) support structure for horizontal conveyor and positioning arms;
d) control input means; and
e) horizontal belt movement monitor means comprising a tachometer.

58. Baggage positioner for reduction of baggage stream width for a stream of baggage items from a conveyor belt comprising:
a) horizontal conveyor having an infeed end and a discharge end;
b) pair of positioning arms, each positioning arm having an infeed end and a discharge end, each positioning arm having a vertical belt with bi-directional vertical belt drive means, the infeed end of the respective positioning arms being positioned on opposing sides of the horizontal conveyor, and the separation of the discharge ends of the respective positioning arms being determined based on the desired baggage stream width reduction;
c) support structure for horizontal conveyor and positioning arms;
d) control input means; and
e) position sensor comprising an ultrasonic volume measuring system.

59. Baggage positioner for reduction of baggage stream width for a stream of baggage items from a conveyor belt comprising:
a) position sensor;
b) horizontal conveyor having an infeed end and a discharge end;
c) movement monitor sensor;
d) leading edge sensor;
e) pair of positioning arms, each positioning arm having an infeed end and a discharge end, each positioning arm having a vertical belt with bi-directional vertical belt drive means, the infeed end of the respective positioning arms being positioned on opposing sides of the conveyor belt, and the separation of the discharge ends of the respective positioning arms being determined based on the desired baggage stream width reduction;
f) discharge sensor;
g) spring loaded vertical slide and one or more pressure sensors in each positioning arm;
h) support structure;
i) positioning arm controller.

60. Baggage positioner for reduction of baggage stream width for a stream of baggage items from a conveyor belt comprising:
   a) position sensing means for sensing the position of baggage items in the baggage steam;
   b) horizontal conveyor having an infeed end and a discharge end;
   c) pair of positioning arms, each positioning arm having an infeed end and a discharge end, each positioning arm having a vertical belt with bi-directional vertical belt drive means, the infeed end of the respective positioning arms being positioned on opposing sides of the conveyor belt, and the separation of the discharge ends of the respective positioning arms being determined based on the desired baggage stream width reduction; and
   d) positioning arm control means.

61. Baggage positioner for reduction of baggage stream width for a stream of baggage items from a conveyor belt comprising:
   a) horizontal conveyor having an infeed end and a discharge end;
   b) pair of positioning arms, each positioning arm having an infeed end and a discharne end, each positioning arm having a vertical belt with bi-directional vertical belt drive means, the infeed end of the respective positioning arms being positioned on opposing sides of the horizontal conveyor, and the separation of the discharge ends of the respective positioning arms being determined based on the desired baggage stream width reduction;
   c) support structure for horizontal conveyor and positioning arms;
   d) control input means; and
   e) discharge sensing means for sensing the leading and trailing edge of a baggage item as it exits the baggage positioner, thereby providing baggage clear confirmation and baggage jam alert data to the control input means.

62. Baggage positioner as recited in claim 61 wherein the discharge sensing means comprises one or more discharge sensors.

63. Baggage positioner as recited in claim 62 wherein the discharge sensors comprise discharge photo sensors.

64. Baggage positioner for reduction of baggage stream width for a stream of baggage items from a conveyor belt comprising:
   a) position sensor;
   b) horizontal conveyor having an infeed end and a discharge end;
   c) pair of positioning arms, each positioning arm having an infeed end and a discharge end, each positioning arm having a vertical belt with bi-directional vertical belt drive means, the infeed end of the respective positioning arms being positioned on opposing sides of the horizontal conveyor, and the separation of the discharge ends of the respective positioning arms being determined based on the desired baggage stream width reduction;
   d) support structure for horizontal conveyor and positioning arms; and
   e) positioning arm controller.

65. Baggage positioner as recited in claim 64 further comprising positioning arm impact sensing means.

66. Baggage positioner as recited in claim 65 wherein the positioning arm impact sensing means comprises a spring loaded vertical slide and one or more pressure sensors in each positioning arm.

67. Baggage positioner as recited in claim 64 wherein the baggage positioner has an infeed end and the position sensor is positioned more or less at the infeed end.

68. Baggage positioner as recited in claim 64 wherein the position sensor comprises one or more vertical position sensors positioned above the baggage stream.

69. Baggage positioner as recited in claim 68 wherein the position sensor further comprises one or more lateral position sensors.

70. Baggage positioner as recited in claim 68 wherein the vertical position sensors are photo sensors.

71. Baggage positioner as recited in claim 64 wherein the position sensor is a photo array light curtain.

72. Baggage positioner as recited in claim 64 wherein the position sensor is a laser volume measurement system.

73. Baggage positioner as recited in claim 64 wherein the position sensor is an ultrasonic volume measuring system.

74. Baggage positioner as recited in claim 64 further comprising arm pivot means for pivoting each of the positioning arms about a respective infeed end pivot axis, thereby providing for varying the separation of the discharge ends of the positioning arms.

75. Baggage positioner as recited in claim 74 wherein the arm pivot means comprises an upstream pivot shaft and a pivot mechanism.

76. Baggage positioner as recited in claim 75 wherein the pivot mechanism comprises a pivot motor, pivot drive, pivot cam, central push rod, pair of opposing lateral push rods, central slide track, central pivot slide slidably mounted to the central slide track, pair of opposing lateral slide tracks, pair of opposing lateral slides with a respective lateral slide being slidably mounted to a respective lateral slide track, and pivot joints connecting the pivot cam to the central push rod, the central push rod to the central slide, the central slide to the lateral push rods respectively and the lateral push rods respectively to the lateral slides, the pivot mechanism being anchored to the support frame and each positioning arm being connected to a respective lateral slide by a respective arm support member.

77. Baggage positioner as recited in claim 64 further comprising horizontal belt movement monitor means.

78. Baggage positioner as recited in claim 77 wherein the horizontal belt movement monitor means comprises a horizontal belt movement momtor sensor.

79. Baggage positioner as recited in 77 wherein the horizontal conveyor has an infeed end drum shaft and the horizontal belt movement monitor means comprises an infeed end optical encoder coupled to the infeed end drum shaft.

80. Baggage positioner as recited in claim 77 wherein the horizontal conveyor has an infeed end drum with a shaft and a sprocket and the horizontal belt movement monitor means comprises a proximity sensor keyed to the sprocket.

81. Baggage positioner as recited in claim 77 wherein the horizontal belt movement monitor means comprises a tachometer.

82. Baggage positioner as recited in claim 64 further comprising leading edge sensing means.

83. Baggage positioner as recited in claim 82 wherein the leading edge sensing means comprises one or more leading edge sensors.

84. Baggage positioner as recited in claim 83 wherein the leading edge sensors comprise leading edge photo sensors.

85. Baggage positioner as recited in claim 64 further comprising discharge sensing means for sensing the leading and trailing edge of a baggage item as it exits the baggage positioner, thereby providing baggage clear confirmation and baggage jam alert data to the control input means.

86. Baggage positioner as recited in claim 85 wherein the discharge sensing means comprises one or more discharge sensors.

87. Baggage positioner as recited in claim 86 wherein the discharge sensors comprise discharge photo sensors.

88. Baggage positioner as recited in claim 65 wherein the positioning arm impact sensing means comprises one or more pressure sensors in each positioning arm.

89. Baggage positioner as recited in claim 64 wherein the bi-directional vertical belt drive means for each of the positioning arms comprises bi-directional vertical belt variable speed drive means.

90. Baggage positioner as recited in claim 64 wherein the bi-directional vertical belt drive means for each of the positioning arms incorporates a variable frequency drive.

91. Baggage positioner for reduction of baggage stream width for a stream of baggage items from a conveyor belt comprising:
 a) position sensing means for sensing the position of baggage items delivered by the conveyor belt to a location where baggage stream width reduction is needed, the position sensing means generating position data; and
 b) repositioning means for repositioning baggage items for baggage stream width reduction using bi-directional vertical belts based upon position data received from the position sensing means.

92. Method for reducing baggage stream width for a stream of baggage items from a conveyor belt comprising:
 a) position sensing step of sensing the position of baggage items delivered by the conveyor belt to a location where baggage stream width reduction is desired and generating position data; and
 b) repositioning step of repositioning each baggage item as needed for baggage stream width reduction by the use of positioning arms with bi-directional vertical belts, repositioning being based upon the position of the baggage item.

93. Method as recited in claim 92 wherein the position sensing step further comprises sensing the width and height of each baggage item for oversize baggage determination and conveyor feed shutdown.

94. Method as recited in claim 92 wherein the position sensing step further comprises sensing the width and height of each baggage item and wherein the positioning arms have a discharge end and the method further comprises a positioning arm adjustment step for adjusting the separation of the discharge end of the positioning arms based upon the height of the baggage item.

95. Method as recited in claim 92 further comprising a pressure sensing step of sensing any impact of each baggage item with a positioning arm thereby generating pressure data and using the pressure data in the repositioning step.

96. Method as recited in claim 92 further comprising a movement monitor step of monitoring the movement of each baggage item thereby generating baggage movement data and using the baggage movement data in the repositioning step.

97. Method as recited in claim 92 further comprising a leading edge sensing step of sensing the leading edge of each baggage item thereby generating leading edge data and using the leading edge data in the repositioning step.

98. Method as recited in claim 92 further comprising a lateral sensing step of sensing the leading edge and the trailing edge of each baggage item during the repositioning step thereby generating baggage location and length data and using the baggage location and length data in the repositioning step.

99. Method as recited in claim 92 further comprising a discharge sensing step of sensing the passage of each baggage item to the location where baggage stream width reduction is desired thereby generating baggage discharge data and using the baggage discharge data for use in the repositioning step for a successive baggage item.

100. Baggage positioner for reduction of baggage stream width for a baggage stream on a conveyor belt comprising:
 a) pair of positioning arms, each positioning arm having an infeed end and a discharge end, each positioning arm having a vertical belt with bi-directional vertical belt drive means, the infeed end of the respective positioning arms being positioned on opposing sides of the conveyor belt, and the separation of the discharge ends of the respective positioning arms being determined based on the desired baggage stream width reduction;
 b) control input means; and
 c) position sensor comprising an ultrasonic volume measuring system.

* * * * *